(12) United States Patent
Burns

(10) Patent No.: US 7,782,185 B1
(45) Date of Patent: Aug. 24, 2010

(54) PROGRESSIVE BRAKE LIGHT APPARATUS

(76) Inventor: Dan M. Burns, 11 9th Ave. SE., Cut Bank, MT (US) 59427

( * ) Notice: Subject to any disclaimer, the term of this patent is extended or adjusted under 35 U.S.C. 154(b) by 413 days.

(21) Appl. No.: 11/838,719

(22) Filed: Aug. 14, 2007

(51) Int. Cl.
B60Q 1/44 (2006.01)
B60Q 1/52 (2006.01)
(52) U.S. Cl. .................. 340/479; 340/471; 340/472
(58) Field of Classification Search .......... 340/471, 340/472, 479
See application file for complete search history.

(56) References Cited

U.S. PATENT DOCUMENTS

| 3,787,808 | A |   | 1/1974  | Knopf            |         |
|-----------|---|---|---------|------------------|---------|
| 4,916,431 | A |   | 4/1990  | Gearey           |         |
| 5,089,805 | A |   | 2/1992  | Salsman          |         |
| 5,150,098 | A |   | 9/1992  | Rakow            |         |
| 5,448,456 | A | * | 9/1995  | Huynh            | 362/540 |
| 5,504,472 | A | * | 4/1996  | Wilson           | 340/479 |
| 5,642,094 | A | * | 6/1997  | Marcella         | 340/479 |
| 5,786,752 | A | * | 7/1998  | Bucalo et al.    | 340/467 |
| 6,573,830 | B2|   | 6/2003  | Cohen et al.     |         |
| 2002/0133282 | A1 | | 9/2002 | Ryan et al.      |         |
| 2008/0297338 | A1 | * | 12/2008 | Singh          | 340/479 |

* cited by examiner

Primary Examiner—Daniel Wu
Assistant Examiner—Mark Rushing
(74) Attorney, Agent, or Firm—Crossley Patent Law; Mark A. Crossley

(57) ABSTRACT

The progressive brake light apparatus sequentially lights three separate brake lights via hydraulic pressure sensing of the brake system between the master cylinder and the rear brakes. The apparatus provides a brake light assembly with the three distinctly different light sources disposed within, each of different size and different color, the brightest and largest being disposed at the top of the brake light assembly and the smallest and dimmest at the bottom of the brake light assembly. The apparatus thereby provides signal to trailing vehicles of the intensity of braking force applied, and therefore with a distinct signal of only initial brake pressure, versus average stopping, versus intense braking.

2 Claims, 3 Drawing Sheets

PROGRESSIVE BRAKE LIGHT APPARATUS

BACKGROUND OF THE INVENTION

According to studies, rear end collisions between motorized vehicles represent more than a third of the traffic accidents experienced, with those same collisions representing a half of resulting injuries. While loss of life and serious injuries are of greatest concern to most, vehicle repair costs are nothing less than monumental, in total. Rear end collisions occur in a variety of situations and for a variety of reasons. Tailgating is certainly a factor in many such collisions. However, other factors can also bear blame, factors such as inclement road conditions, traffic, improper lane changes, type and condition of vehicle, tires, driver, rate of deceleration of the leading car, and a host of others. Recent additions have been made to brake lights wherein an additional brake light is required and is installed in a position elevated above standard brake lights used prior to 1985. Studies often disagree with the effectiveness of such added lights, and rear end accidents remain a vital concern.

Various devices have been proposed which can warn a trailing car of a leading car's deceleration, thereby attempting to differentiate between normal deceleration or braking and intense braking, such as in a panic stop. Some propose involved, expensive devices with complicated circuitry. Such devices have not been accepted or embraced. Other devices have proposed the use of accelerator pedal or linkage sensing devices or engine manifold pressure. Inertia switches have been proposed, but inertia switches are already in use in trailer braking systems and are complimented by few. Systems have been proposed which sense brake pedal travel, but brake pedal travel varies from one car to the next and also varies with brake component wear and other brake problems. Adjustments required of such systems do not promise their use. In all, the previously proposed sequentially lit brake light systems have not received acceptance. What is needed, then, is a basic system which is inexpensive, readily fitted, and which clearly, distinctly, and sequentially warns a trailing vehicle of braking intensity, from initial brake pedal application to full panic stop. Such a system would allow a trailing vehicle operator to react properly to the leading vehicle, and to even in turn allow subsequent trailing vehicles to do the same. The present apparatus provides these features.

FIELD OF THE INVENTION

The progressive brake light apparatus relates to brake light systems and more especially to a progressive brake light apparatus which sequentially lights three separate brake lights via hydraulic pressure of the brake system.

SUMMARY OF THE INVENTION

The general purpose of the progressive brake light apparatus, described subsequently in greater detail, is to provide a progressive brake light apparatus which has many novel features that result in an improved progressive brake light apparatus which is not anticipated, rendered obvious, suggested, or even implied by prior art, either alone or in combination thereof.

To attain this, the progressive brake light apparatus comprises a hydraulic pressure sensor for fit between the brake cylinder and a rear brake line. The pressure sensor is fitted with low, medium, and high pressure sensors within. Each sensor is adjustable as to pressure required to relay electrical signal to the appropriate amber, red and purple light sources. Each light source is in communication with one of the pressure sensors. The amber light source connects to the low pressure sensor and warns any following traffic of potential impending stop, a brake line pressure has been sensed. The red light source, disposed in the center of the brake light assembly is connected to the medium pressure sensor and warns any following traffic of a normal stopping execution. The purple light source is connected to the high pressure sensor and warns of panic, or emergency stopping. The light sources therefore respond sequentially, with each energized light remaining on until the brake pedal is released. Trailing vehicles are therefore aware of the conditions of a particular stop.

The three distinct colors are easily identified. Each progressive braking application is linked to a progressively brighter and larger light source. Each progressive braking application is linked to a light source disposed on a higher position on the vehicle, further enabling recognition. The basic apparatus thereby provides instant recognition, basic design and operation, and early progressive warning of braking conditions. An added advantage of the system is that drivers who ride their brakes normally engage their red braking lights, causing trailing drivers to eventually ignore such drivers, until and upon the condition when the signal is real. This automotive "crying wolf" is prevalently cited in testimony. The amber signal afforded by the present apparatus prevents such occurrences. And, the bright purple is immediately recognized and provides the trailing driver to aggressively apply brakes.

Thus has been broadly outlined the more important features of the improved progressive brake light apparatus so that the detailed description thereof that follows may be better understood and in order that the present contribution to the art may be better appreciated.

An object of the progressive brake light apparatus is to illuminate separate light sources of the brake light assembly, according to braking intensity.

Another object of the progressive brake light apparatus is to function via brake line pressure.

A further object of the progressive brake light apparatus is to light sources from bottom to top, with bottom signaling lowest braking intensity.

An added object of the progressive brake light apparatus is to differentiate between light sources via size and coloration.

And, an object of the progressive brake light apparatus is to light progressively even under severe braking conditions.

A further object of the progressive brake light apparatus is to be basic and therefore affordable.

Yet another object of the progressive brake light apparatus is to prevent rear end collisions.

These together with additional objects, features and advantages of the improved progressive brake light apparatus will be readily apparent to those of ordinary skill in the art upon reading the following detailed description of presently preferred, but nonetheless illustrative, embodiments of the improved progressive brake light apparatus when taken in conjunction with the accompanying drawings.

In this respect, before explaining the current embodiments of the improved progressive brake light apparatus in detail, it is to be understood that the progressive brake light apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved progressive brake light apparatus. It is therefore important that the claims be regarded as including such equivalent constructions insofar as they do not depart from the spirit and scope of the progressive brake light apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the progressive brake light apparatus generally designated by the reference number 10 will be described.

Referring to FIGS. 1 through 4, the progressive brake light apparatus 10 is for fit to the rear of a motor vehicle. The brake light assembly 22 of the apparatus 10 can be fitted separately from other taillights or can be incorporated into original manufacture. The apparatus 10 comprises a hydraulic pressure sensor 12 for fit between a brake cylinder and a rear brake line of the vehicle. The sensor 12 is further capable of electrical relay from an electrical system of the vehicle to the brake light assembly 22.

Figure 4:
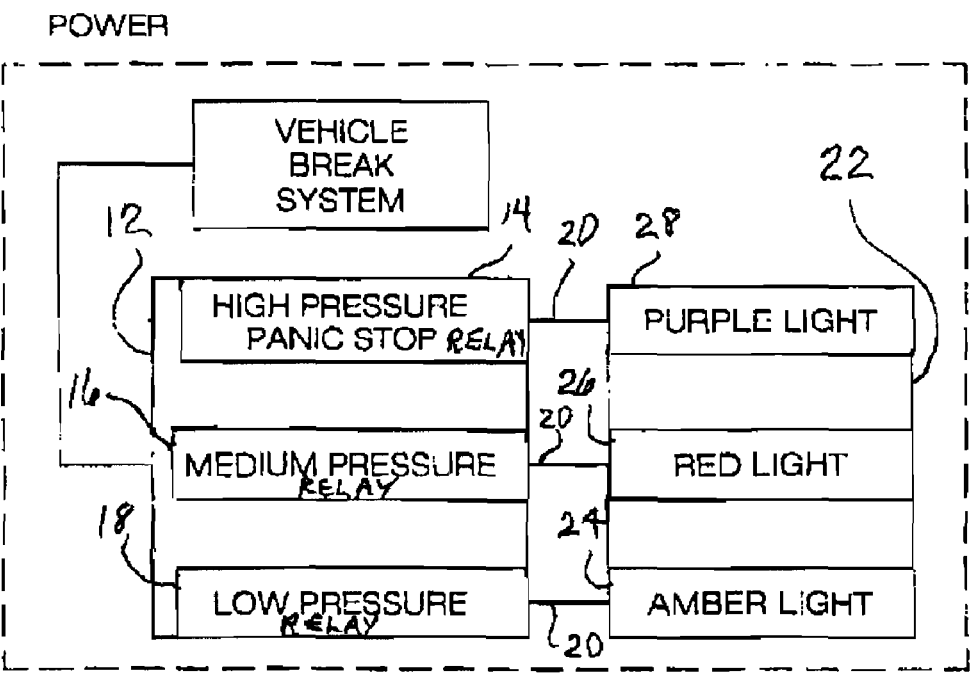
FIG. 4 is schematic block diagram of the apparatus.
Figure 5:
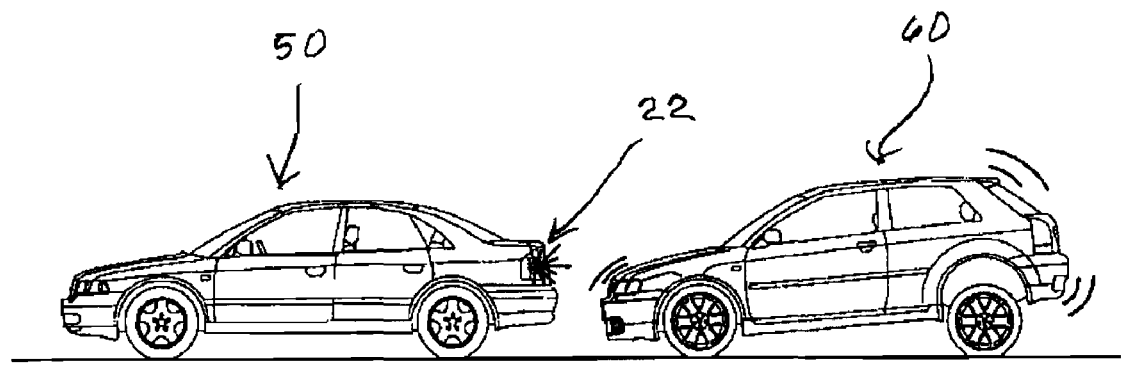
FIG. 5 is a lateral elevation view of a leading auto equipped with the apparatus followed by a trailing auto not so equipped, the trailing auto under severe braking in recognition of the emergency stop of the leading auto.

Referring to FIG. 4, the sensor 12 further comprises a low pressure sensor 18. The low pressure sensor 18 is in electrical communication with the amber light source 24 of the brake light assembly 22. The low pressure sensor 18 recognizes initial brake line pressure and signals the amber light source 24 to illuminate. The low pressure sensor 18 is adjustable for threshold lighting signal to the amber light source 24. The medium pressure sensor 16 provides signal to the red light source 26 for signaling illumination under normal stopping of a vehicle. The medium pressure sensor is 16 adjustable for threshold lighting signal to the red light source 26. The high pressure sensor 14 senses pressure during a panic or near panic stop of a vehicle. The high pressure sensor 14 signals the purple light source 28 for illumination. Adjustability of each of the low pressure sensor 18, the medium pressure sensor 16, and the high pressure sensor 14 provide for vehicle variations in operation. For example, various motor vehicle braking systems operate at different pressure ranges for initial pedal application and hence brake line pressure, normal stopping pedal application and brake line pressure, and high pressure application and brake line pressure during emergency stops.

Pressure variations exist due to a host of factors, among which are vehicle weight, brake line size and composition, types of brake components, and integrity of hydraulic system components.

Figure 1:
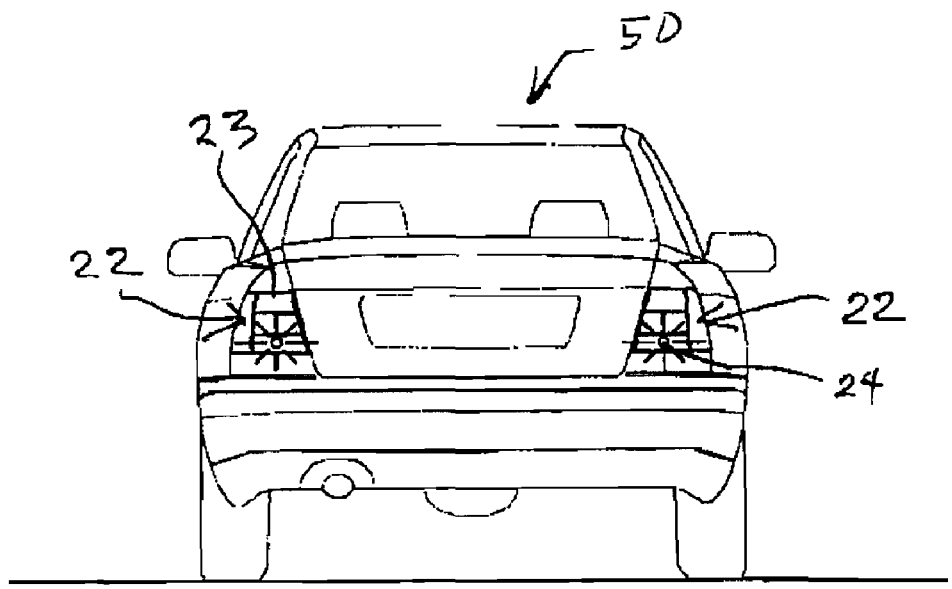
FIG. 1 is a rear elevation view of a leading auto with the apparatus installed, the amber light source illuminated.
Figure 2:
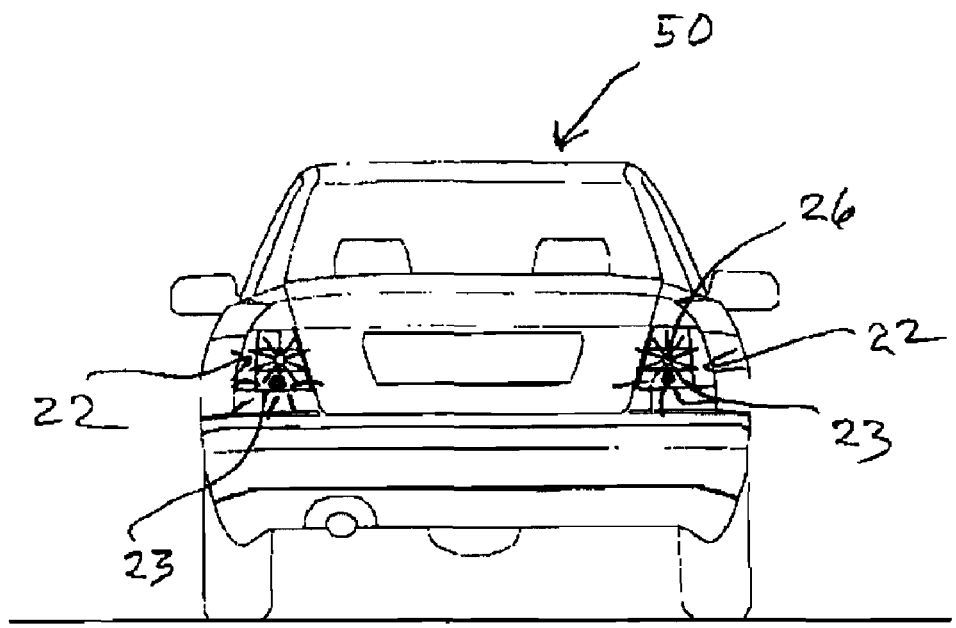
FIG. 2 is a rear elevation view of FIG. 1, with the red light source illuminated.
Figure 3:
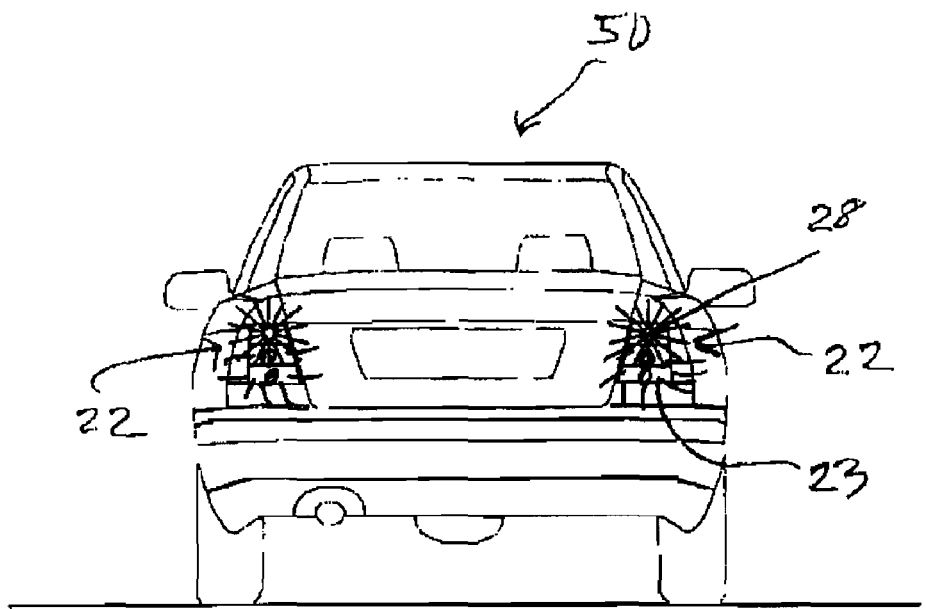
FIG. 3 is rear elevation view of FIG. 1, with purple light source illuminated.

Referring to FIGS. 1-3, the leading auto 50 is equipped with the apparatus 10. The brake light assembly 22 comprises a housing 23 for fit to the rear of the vehicle 50. The trio of separate light sources including the amber light source 24, the red light source 26, and the purple light source 28 is connected to each of the low pressure sensor 18, the medium pressure sensor 16, and the high pressure sensor 14, respectively, of the hydraulic pressure sensor 12. The separate light sources further comprise the small amber light source 24 disposed within the bottom of the brake light assembly 22. The amber light source 24 is the smallest of the three light sources. The red light source 26 is disposed within an approximate center of the brake light assembly 22. The red light source 26 is larger than the amber light source 24. The purple light source 28 is disposed within the top of the brake light assembly 22. The purple light source 28 is larger than the red light source 26 and therefore the largest of the light sources.

In FIG. 1, the leading auto 50 has just begun to apply the brake. Initial brake line pressure is sensed by the low pressure sensor 18 of the hydraulic pressure sensor 12 of the apparatus 10. The low pressure sensor 18 has communicated to the amber light source 24 via the electrical connection 20.

Referring to FIG. 2, the auto 50 has applied the brakes in a normal deceleration mode. The centrally disposed red light source 26 is lit. The amber light source 24 remains lit.

In FIG. 3, the brakes have been applied in an emergency stop. The top, purple light source 28 is therefore illuminated. The amber light source 24 and the red light 26 source remain illuminated.

Of note, initial brake line pressure lights the amber light source 24 under any braking line pressure.

If normal deceleration braking is applied, the amber light source 24 lights first immediately followed by the red light source 26. Upon lighting of the red light source, the amber light source 24 still remains lit. Both red light source 26 and amber light source 24 remain lit until brake line pressure is released. Under heavy braking, the above sequence is followed by the illumination of the purple light source 28. The amber light source 24 and the red light source 26 also remain lit.

With respect to the above description then, it is to be realized that the optimum dimensional relationships for the parts of the progressive brake light apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the progressive brake light apparatus.

Directional terms such as "front", "back", "in", "out", "downward", "upper", "lower", and the like may have been used in the description. These terms are applicable to the embodiments shown and described in conjunction with the drawings.

These terms are merely used for the purpose of description in connection with the drawings and do not necessarily apply to the position in which the progressive brake light apparatus may be used.

Therefore, the foregoing is considered as illustrative only of the principles of the progressive brake light apparatus. Further, since numerous modifications and changes will readily occur to those skilled in the art, it is not desired to limit the progressive brake light apparatus to the exact construction and operation shown and described, and accordingly, all suitable modifications and equivalents may be resorted to, falling within the scope of the progressive brake light apparatus.

What is claimed is:

1. A progressive brake light apparatus for a motor vehicle, the apparatus consisting of:
- a hydraulic pressure sensor for fit between a brake cylinder and a rear brake line of the vehicle, the sensor further capable of electrical relay from an electrical system of the vehicle, the sensor further comprising:
  - a low pressure sensor;
  - a medium pressure sensor;
  - a high pressure sensor;
- a brake light assembly, the assembly comprising:
  - a housing for fit to the rear of the vehicle;
  - a trio of separate light sources connected to each of the low pressure sensor, the medium pressure sensor, and the high pressure sensor, respectively, of the hydraulic pressure sensor,
- whereby initial brake line pressure lights the amber light source, medium brake line pressure lights the red light source, and high brake pressure lights the purple light source;
- wherein the trio of separate light sources are disposed vertically;
- wherein each of the trio of separate light sources further comprises a different color;
- wherein each of the trio of separate light sources further comprises a different size;
- wherein the different sizes of light sources further comprise:
  - a smallest size light source connected to the low pressure sensor;
  - a medium size light source connected to the medium pressure sensor;
  - a largest size light source connected to the high pressure sensor;
- wherein the largest size light source is uppermost in the vertical disposition of the light sources;
- wherein the medium size light source is disposed below the largest size light source;
- wherein the smallest size light source is disposed below the medium size light source.

2. A progressive brake light apparatus for a motor vehicle, the apparatus consisting of:
- a low pressure sensor;
- a medium pressure sensor;
- a high pressure sensor;
- adjustability for each pressure sensor;
- a brake light assembly
- a small amber light source disposed within a bottom of the progressive brake light apparatus assembly, the small amber light connected to the low pressure sensor;
- a red light source disposed within an approximate center of the progressive brake light apparatus assembly, the red light source larger than the amber light source, the red light source connected to the medium pressure sensor;
- a purple light source disposed within a top of the progressive brake light apparatus assembly, the purple light source larger than the red light source, the purple light source connected to the high pressure sensor,
- whereby initial brake line pressure lights the amber light source, medium brake line pressure lights the red light source, and high brake pressure lights the purple light source.

* * * * *